Figure 1:
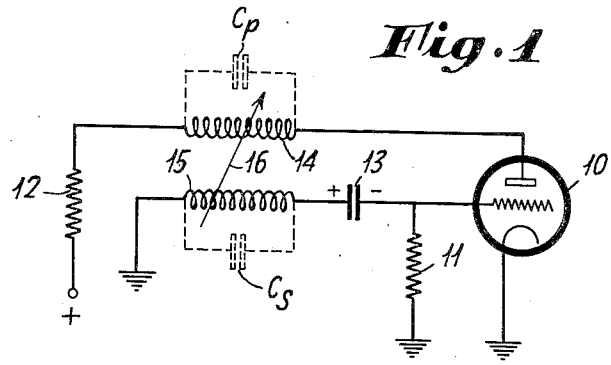

Aug. 20, 1940.    M. GEIGER    2,211,852

BLOCKING OSCILLATOR APPARATUS

Filed March 22, 1938

INVENTOR
*MAX GEIGER*
BY
ATTORNEY

Patented Aug. 20, 1940

2,211,852

UNITED STATES PATENT OFFICE

2,211,852

BLOCKING OSCILLATOR APPARATUS

Max Geiger, Berlin, Germany, assignor to Telefunken Gesellschaft für Drahtlose Telegraphie m. b. H., Berlin, Germany, a corporation of Germany Application March 22, 1938, Serial No. 197,525
In Germany January 22, 1937

3 Claims. (Cl. 250—36)

For some practical purposes occurring in electrotechnical technology, for instance, in television and electric distance measuring outfits predicated upon the use of reflected waves, current or voltage impulses are required of the kind possessing as steep as possible a front or face. For producing these waves there may be used blocking oscillators having inductive coupling between the plate circuit and the grid circuit.

Now, this invention is based upon the discovery that by choosing a suitable construction for the transformer which provides the inductive coupling between the plate and the grid circuit, the steepness of the front or the face of the impulses may be essentially improved.

In order to get an understanding of how great an influence the properties of the transformer may have upon the steepness of the face or front of the impulses supplied from the oscillator, the operation or property of the blocking oscillator shall be explained in more detail hereinafter.

My invention will best be understood by reference to the drawing, in which

Figure 2:
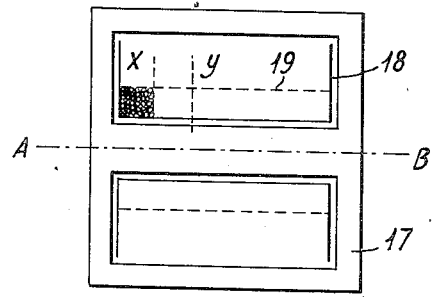
Figure 3:
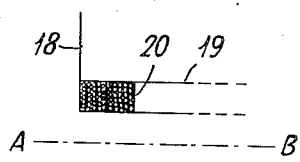
Figure 4:
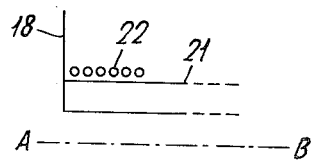

Fig. 1 shows one embodiment thereof,

Figs. 2, 3, and 4 show winding arrangements for coupling purposes.

Referring to Fig. 1, there is shown a vacuum tube 10, in this case a triode having anode, cathode, and control electrode respectively. The cathode is grounded, and connected between the grid and the ground is a resistance 11 and also a series circuit comprising a condenser 13 and a coupling coil 15. The various skeleton capacities as distributed capacities, capacity of leads, etc. are indicated by the dotted lines. Connected in the anode circuit of the valve 10 is also a coupling coil 14 which is shown as being variably coupled with the coupling coil 15 by the schematic showing identified as 16. Joined in series with the coupling coil 14 is a resistance element 12, the other end of which is joined to the positive terminal of the anode supply battery (not shown).

In further explanation of the operation of the circuit of Fig. 1, the assumption shall be made that the tube 10 for the time being carries no current, and that the condenser 13 has a charge having a sign as indicated and being negative on the side of the condenser joined to the grid of the tube 10. Moreover, the potential across the condenser 13 shall be supposed to surpass that impressed upon the grid of tube 10 required with a view to reducing the plate current to the zero level. Inasmuch as the D. C. resistance of the winding 15 may be assumed to be zero, the condenser 13 will discharge at a rate which is governed only by the size of resistance 11 and the capacity of the condenser 13. Now, as long as the voltage at the condenser 13, that is to say, the drop of potential across resistance 11 is higher than the value co-ordinated to the bottom bend of the plate current-grid voltage characteristic (mutual conductance) of tube 10, no plate current will be able to flow. However, as soon as the condenser potential has decreased to a point where a small plate current starts to flow, such a potential will arise at the secondary winding 15 by virtue of the magnetic linkage with the plate circuit that there occurs a growth of grid potential. This results in a further growth of the plate current which, in turn, entails a further shift of the grid potential in the sense of a growth of the plate current. This cycle prevails until incipient flow of a grid current in the tube is noticed which again will charge the condenser 13 in the sense of the plus and minus signs indicated in the drawing and being negative on the side of the condenser joined to the grid of the tube 10. As soon as the plate current has reached its crest value, the potential acting at the secondary winding 15 is reversed, with the consequence that the grid potential moves again away in a negative sense from the potential of the cathode at which it was previously, with the result that the flow of plate current is broken again. The above-mentioned initial conditions, that is, that the current-flow through the tube should be zero, and that across the condenser 13 there should prevail a potential tending to block the tube, are again fulfilled, so that the process may be reiterated in a mode as has hereinbefore been outlined.

Now, exhaustive research has shown that the self-capacitance of the primary winding 14 as indicated in Fig. 1 by the dash-line condenser $C_p$ plays an essential part in so far as it precludes a rapid growth of the plate current which, as will be understood, presupposes the building up of a high voltage across the terminals of the primary winding. In fact, the arising of a potential across the terminals of the primary winding will proceed only in accordance with the time constant resulting from the product of capacity $C_p$ and the internal resistance of tube 10 as well as resistance 12, it being evident that the building up of potential across the terminals of the primary winding may occur only at the same rate with which the condenser $C_p$ is charged up by way of the said resistances. Referring to Fig. 2, there is shown a coil arrangement illustrating the winding of the primary coil of the transformer illustrated in Fig. 1. Heretofore in winding transformers, in most instances the wire has been wound continuously from one extremity of the coil to the other in the form of a layer and other layers have been wound on top of this in a similar fashion, that is to say, each complete layer ran from one extremity of the winding to the other. On the other hand, in my arrangement the windings are wound so as to form individual sections. The primary winding in this arrangement may be wound to fill the space between the yoke of the transformer and the vertical line X for instance on one hand, and from the center arm of the core to the line 19, thus forming a completely filled rectangular space. Next, the winding may completely fill the space between the vertical lines X and Y on the one hand, and the center arm of the core and the line 19 on the other hand; thus, filling another rectangular space so that in effect the coil is wound in individual sections or wound so as to fill individual sectional areas of the space between the center arm of the core and the yoke members.

Another illustrative embodiment of this invention which shall be described by reference to Fig. 3 consists of the feature that the primary winding comprises a plurality of disc coils which are placed directly contiguous to one another. The graphic representation of Fig. 3 is restricted only to part of the coil former 18 and to two disc windings. The latter in this scheme could be embodied, say, between two mica discs, one of which is illustrated as 20 or else they could be fixed merely by varnishing applied in the course of the winding process or after completion of the coil in a winding form by subsequent lacquering in the disc shape.

It has also been ascertained by extensive research that the self-capacitance of the secondary winding 15 which is indicated in Fig. 1 by the condenser $C_s$ shown by dash-lines is of importance also in so far as it is able to prevent the rapid arising of a potential across the winding 15 seeing that the rapid building up of a potential is tantamount to the occurrence of high frequencies at the secondary winding, and since these high frequencies are short-circuited by the condenser $C_s$. Hence, according to the invention, the secondary winding is to be designed in a form as hereinbefore explained for the primary winding, that is, regardless of whether the invention is adopted in connection with the primary winding or not.

A form of construction as hereinbefore disclosed for the primary and/or the secondary winding inheres a further merit in so far as the stray of the transformer turns out to be low, and this also favors the conditions conducive to the desired steepness of the front or face of the impulses.

The steepness of the face of the sawtoothed wave developed in this apparatus may be improved by providing a secondary winding which comprises a single layer winding which may lie directly on the insulation covering the layer or layers of the primary winding, and in addition the series of disc shaped windings which have been set out hereinbefore and explained with reference to Figure 2. There results then a secondary comprising a single layer of winding and a series of disc shaped windings. This single layer part of the secondary winding minimizes capacitive coupling between the primary and the secondary. The coupling between the primary and secondary affects the steepness of the front of the developed wave in so far as in the presence of a high capacitance between the primary and secondary windings and particularly the end sections thereof, there would occur a decrease of plate potential in the tube 10 as a result of the current flowing through said capacitance when the grid potential of tube 10 increased in value. However, such capacitive coupling between high potential sections of one winding and low potential sections of the other may be prevented or minimized by making part of the secondary winding in the shape of a single layer. An alternative arrangement would be to provide between the primary and secondary windings a grounded open winding. Also the voltage drop along the windings may be minimized by winding the single layer section of the secondary with a wire having a greater cross-sectional area than that used in the disc shaped sections. Such an arrangement is shown in Figure 4 where the winding 22, for instance, has a greater cross-sectional area than that illustrated as 20 in Figure 3.

What I claim is:

1. A sawtooth wave generator comprising a thermionic vacuum tube having anode, cathode and at least one control electrode, a source of potential for biasing the anode of said tube, a first resistive means, a series circuit including said source of potential, said resistor, said anode, said cathode and a first inductive member, a second resistive means connected in the cathode-grid circuit of the tube, a capacity connected to the control grid of the tube, and a series circuit comprising said control grid, said capacity, said cathode and a second inductive member, said second inductive member being coupled to said first inductive member, said second inductive member comprising a series of disc shaped coils.

2. Apparatus in accordance with claim 1 wherein both said first inductive member and the said second inductive member comprise inductances formed by the serial connection by a plurality of disc shaped inductances.

3. Apparatus in accordance with claim 1 wherein a grounded open winding is inserted between said first inductive member and said second inductive member.

MAX GEIGER.